UNITED STATES PATENT OFFICE.

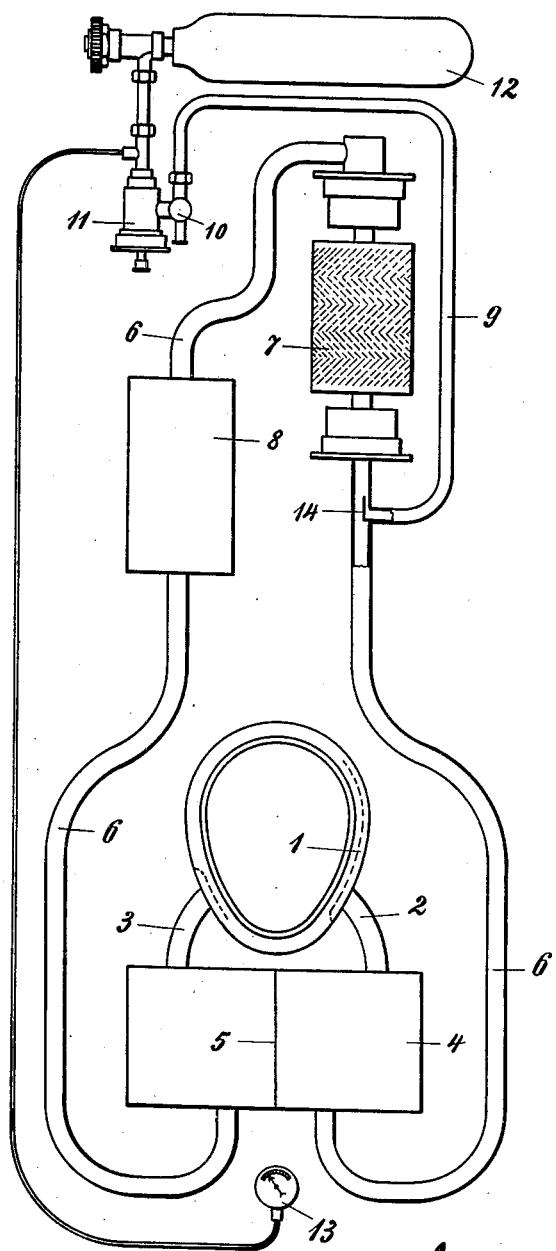

DETLEF KARL HEINRICH SCHÜMANN, OF HAMBURG, GERMANY.

RESPIRATOR.

1,353,857.   Specification of Letters Patent.   Patented Sept. 28, 1920.

Application filed December 8, 1913, Serial No. 805,346.   Renewed February 17, 1920.   Serial No. 359,313.

*To all whom it may concern:*

Be it known that I, DETLEF KARL HEINRICH SCHÜMANN, a subject of the King of Prussia, residing at 35 Rödingsmarkt, Hamburg, Germany, have invented certain new and useful Improvements in Respirators, of which the following is a specification.

My invention relates to a self-contained, preferably portable, respirator, which operates on the regeneration principle and serves, for example, to provide breathing air, that is to say, purify the used air for firemen or rescue parties, in rooms which are filled with injurious gases. According to the invention, the carbon dioxid and a part of the hydrogen, which is exhaled is removed by chemical means from the exhaled air and the latter, after the addition of new oxygen, is again returned to the person employing the apparatus. A closed cycle is maintained and none of the surrounding atmosphere is admitted into the system.

The introduction of the oxygen into the air, has heretofore taken place in various ways. According to the present invention the fresh oxygen is introduced into the exhaled air before the latter passes into the purifying device. The introduction of oxygen in the present case, as distinguished from previously known devices in which the oxygen was introduced into the air by means of an injector, takes place in a conduit of such ample cross section that a stoppage, which can easily occur in the ordinary device by reason of the necessarily small openings, is safely avoided. By suitably directing the incoming current, the gas mixture in the present case is, by reason of the strength of the current of oxygen, positively driven through the purifying device and through the entire cycle. The treatment of the gas mixture in the purifying device also takes place in a new manner, as the purification and absorption materials are mixed with an inert and highly porous substance, for example, pumice stone. This mixture is advantageously arranged in a definite, stratified form, a layer consisting of a mixture of absorption material and the porous body alternating with a layer consisting solely of this porous body. Especially by this arrangement, an extensive absorption of the liquid produced in the regeneration is obtained.

The frictional resistance, which had to be reckoned with in prior devices, because of the continual variation in the direction of the current, is lessened by this arrangement of the purification and absorption material in layers. Due to the injector, this frictional resistance was heretofore sufficiently got over, but therefore the above mentioned disadvantages of the injector had to be taken into account. To this was to be added the fact that the generation of considerable heat always present in such regeneration devices was further increased by the compression in the injector passage. In the construction according to the present invention the expansion of the oxygen effects a considerable cooling which is beneficial to the entire device, and any form of injector action is avoided.

The accompanying drawing illustrates diagrammatically a device constructed in accordance with the present invention in which the purification and regeneration devices are shown in section.

The breathing mask 1 is connected by two tubes 2 and 3 with the air tank 4, which consists of two chambers separated from each other by a partition wall 5. To the right hand chamber of tank 4 there is connected a pipe 6 which leads to the purifying device 7 and further through a cooler 8 back to the left hand chamber of the tank 4. To the pipe 6, a branch tube 9 is connected near the purifying device 7, which branch tube 9 is connected through a safety-valve 10 and a reducing valve 11 with an oxygen tank 12. The oxygen tank is provided in the usual manner with a manometer 13. At the entrance of branch pipe 9 into the main pipe 6 a wall 14 is provided, which projects into the main pipe in such a way that the incoming oxygen which mixes with the exhaled gas produces a positive direction of current in the entire gas mixture. At this point the area of the incoming current is so ample, that a stopping up of the passage way can not occur, and likewise compression accompanied by heat can not take place. The entire mass passes into the purification chamber 7 in which alternate layers of, for example, a mass of clean pumice stone, having large pores, and a mass of such pumice stone and granular purifying chemicals are arranged. In the drawing this stratification is represented by the different section lines. By the mixing with the pumice stone having large pores, every grain of the purifying mass is maintained in a fixed position so that it can be enveloped on all sides by the gas mixture. Furthermore, in this way the sticking together of the individual grains and their ultimate formation of an impenetrable layer is avoided.

I claim:

1. A respirator of the character described, comprising in combination, a mask, a purifying device, a passage-way for leading exhaled gases from said mask to said purifying device, means for introducing fresh oxygen into said passageway, and means for returning the regenerated air to said mask.

2. A respirator of the character described, comprising in combination, a mask, a purifying device, a passageway for leading exhaled gases from said mask to said purifying device, means for introducing into said passageway a current of fresh oxygen directed toward said purifying device, and means for returning the regenerated air to said mask.

3. A respirator of the character described, comprising in combination a mask, and freely permeable means suitably communicating therewith for removing impurities from the exhaled air, said means comprising purification and absorption material distributed in granular form throughout a mass of inert highly porous material.

4. A respirator of the character described, comprising in combination a mask, and means suitably communicating therewith for removing impurities from the exhaled air, said means comprising alternate layers of inert highly porous material mixed with purification and absorption material and intermediate layers of inert highly porous material.

5. A respirator of the character described, comprising in combination a mask, and freely permeable means suitably communicating therewith for removing impurities from the exhaled air, said means comprising purification and absorption material distributed in granular form throughout a mass of highly porous pumice stone.

6. A respirator of the character described, comprising in combination a mask, freely permeable means suitably communicating therewith for removing impurities from the exhaled air, comprising purification and absorption material distributed in granular form throughout a mass of inert highly porous material and non-compressing means for leading fresh oxygen into the exhaled air.

DETLEF KARL HEINRICH SCHÜMANN.

Witnesses:
ERNST H. L. MUMMENHOFF,
IDA CHRIST HAFERMANN.